Sept. 25, 1923.
C. C. PATTEN ET AL
SIGN FOR AUTO DOORS
Filed April 13, 1922
1,468,672
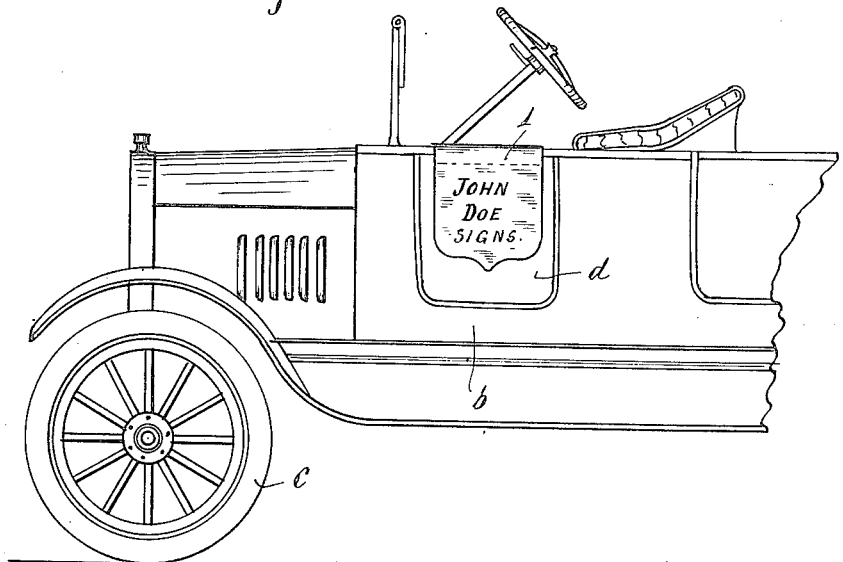
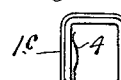
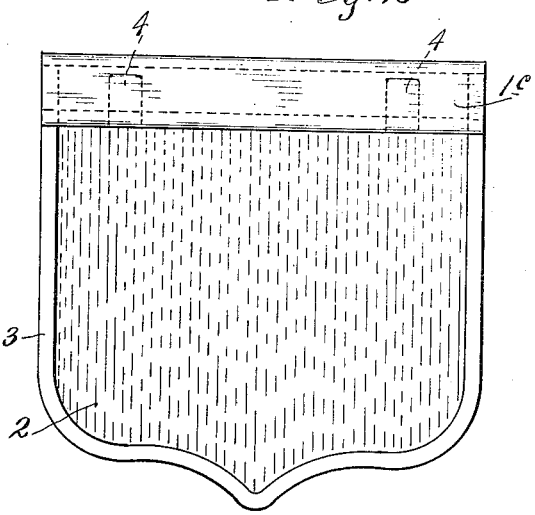
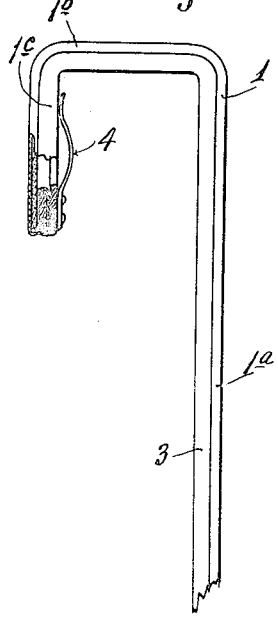
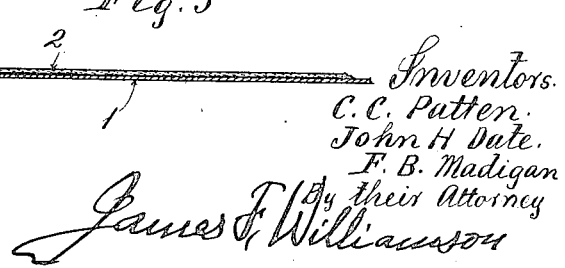
Inventors.
C. C. Patten.
John H. Date.
F. B. Madigan.
By their Attorney
James F. Williamson Patented Sept. 25, 1923.

1,468,672

UNITED STATES PATENT OFFICE.

CHARLES C. PATTEN AND JOHN H. DATE, OF MINNEAPOLIS, AND FRANK B. MADIGAN, OF MANKATO, MINNESOTA.

SIGN FOR AUTO DOORS.

Application filed April 13, 1922. Serial No. 552,255.

*To all whom it may concern:*

Be it known that we, CHARLES C. PATTEN, JOHN H. DATE, and FRANK B. MADIGAN, citizens of the United States, residing at Minneapolis and Mankato, respectively, in the counties of Hennepin and Blue Earth, respectively, and State of Minnesota, have invented certain new and useful Improvements in Signs for Auto Doors; and we do hereby declare the following to be a full, clear, and exact description of the invention, such as will enable others skilled in the art to which it appertains to make and use the same.

This invention relates to an advertising device and particularly to such a device in the form of a sign adapted to be detachably held on an automobile door. A great many business men use an automobile of the touring car or other type for business and also use the same car for pleasure riding. Such persons very frequently desire to have some advertising of their business on the body of the car for use during the week, but when pleasure riding on Sunday or other times, or in going to church or to special affairs, it is desired to have the car free from advertising.

It is an object of this invention, therefore, to provide an advertising device which can be readily placed on the automobile door and will be held in secure position thereon but can be very readily detached when the same is not desired.

It is a further object of the invention to provide such a device composed of sheet material having resilient means for holding the same in place and being provided with suitable material to contact the finished portions of the automobile, so as not to mar the same.

These and further objects and advantages of the invention will more fully appear from the following description made in connection with the accompanying drawing, in which like reference characters refer to the same parts throughout the different views, in which—

Fig. 1 is a view in side elevation of a portion of an automobile showing the device attached thereto;

Fig. 2 is a front view of the inside of the device;

Fig. 3 is a view in side elevation thereof;

Fig. 4 is a partial view in side elevation shown on an enlarged scale, a portion thereof being in section; and Fig. 5 is a partial transverse section of the device on an enlarged scale.

Referring to the drawings:

In Fig. 1 is shown a representation of a standard automobile comprising the body portion $b$, the wheel $c$ and a door $d$. The device of the present invention comprises a member 1 of sheet material, preferably sheet metal, having a flat portion $1^a$ of considerable extent adapted to extend over and contact with the exterior of the door $d$. This portion of the member 1 can be made of various shapes or designs as may be desired. The member 1 also has a portion $1^b$ adapted to extend over the top of the door and has the portion $1^c$ adapted to extend a short distance down the inside of the door. The inside surface of the member 1 or the surface in contact with the said door is provided with a covering 2 of felt or similar soft material. This covering is preferably held in place by bending the edge of member 1 inwardly and clamping the edge of the felt by the said bent portion and the main body portion of the member 1. The inturned edge of the member 1 which clamps the felt is again bent outwardly as shown at $1^d$ and is adapted to enter the slit in a slitted piece of rubber 3. The portion $1^a$ is pressed down and firmly holds the rubber 3 in place. This rubber strip 3 surrounds the edge of the entire door engaging surface of the device. Secured to the inner side of the portion $1^c$ is a pair of spaced small plate springs 4 having one end attached adjacent the edge of said portion and bent to extend outwardly therefrom.

In the use of the device, the same is placed on the automobile door as shown in Fig. 1, portion $1^a$ extending over the outside thereof and the portion $1^b$ and $1^c$ extending over the top and inside thereof. The springs 4 are covered with felt or similar material and will contact the inside of the door and yieldingly hold the device in firm position thereon. The felt 2 and the rubber strip 3 will effectively prevent the device from marring the finished portions of the car and together with the springs 4 will positively prevent any rattling of the device. The sign is thus held firmly and noiselessly in position. When it is desired to remove the device, the same is simply lifted, the springs 4 yielding to permit the movement of the same. The device can thus be instantly placed in position or taken off of the door.

From the above description, it is seen that applicant has provided an extremely simple and efficient advertising device for an automobile door and one that will have great utility for the purpose had in view. The sign can, of course, be made in various colors and have various finishes given thereto.

It will, of course, be understood that various changes may be made in the form, details and proportions of the device without departing from the scope of applicant's invention, which generally stated consists in the matter shown and described and set forth in the appended claims.

What is claimed is:—

1. A detachable advertising device for a vehicle door comprising, a sheet of material bent substantially at right angles at its upper end to form an inverted channel, which channel is adapted to fit over the top of said door, the inner side of said channel being equipped with spaced bowed spring plates covered with non-abrasive material adapted to contact the inner side of said door to hold the device firmly in position, the main portion of the sheet extending over the outside of the door to constitute a sign.

2. The structure set forth in claim 1, the inner side of the sheet having a strip of soft yielding material secured thereto adjacent its edge and adapted to contact the top and outer side of the door.

In testimony whereof we affix our signatures.

CHARLES C. PATTEN.
JOHN H. DATE.
FRANK B. MADIGAN.